Dec. 21, 1937.     J. P. SMITH     2,102,757
COMBINED HOUSED ELECTRICAL DEVICE AND CABLE SEALING MEANS
Filed Oct. 31, 1935
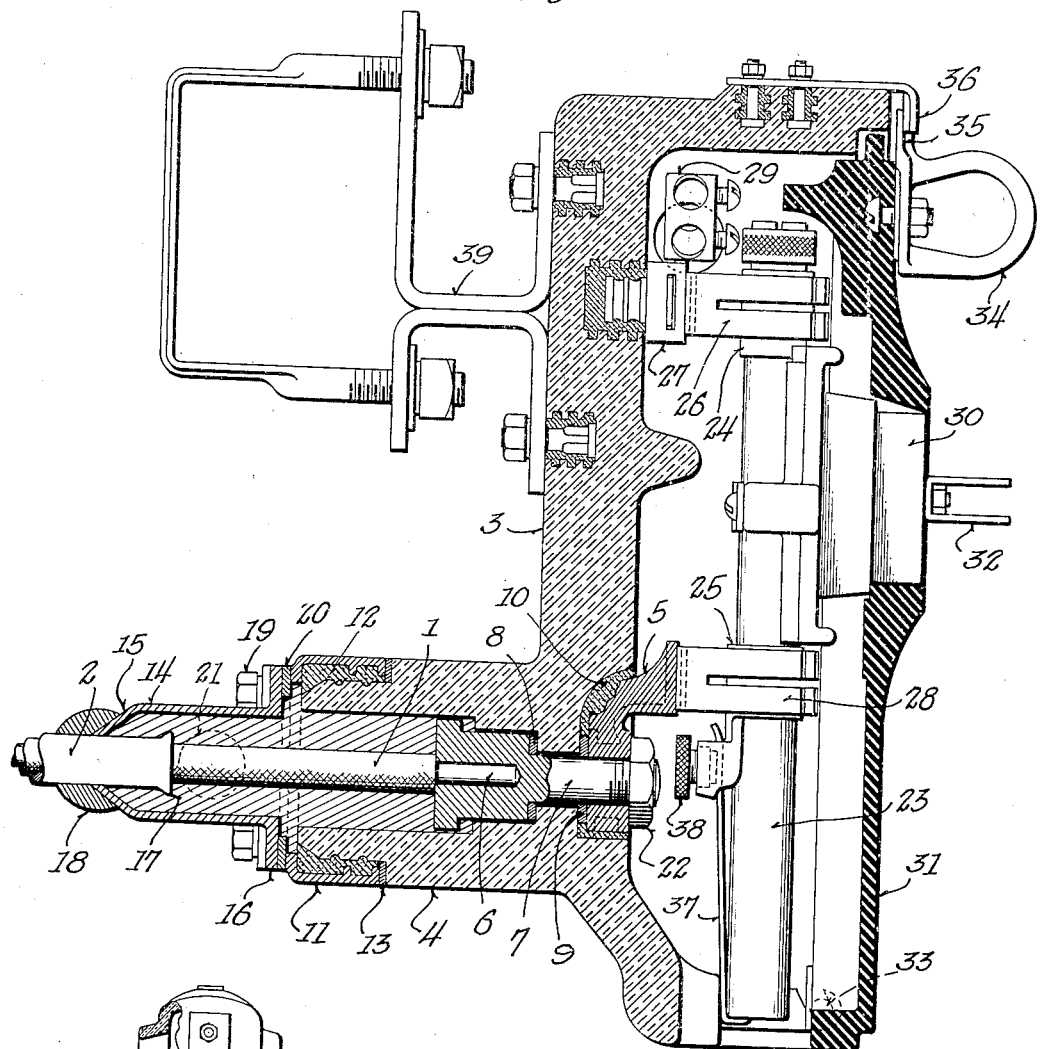
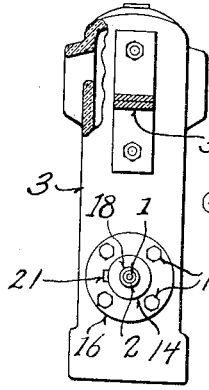
INVENTOR.
James P. Smith
BY
Arthur R. Woolfolk
ATTORNEY.

Patented Dec. 21, 1937

2,102,757

UNITED STATES PATENT OFFICE 2,102,757

COMBINED HOUSED ELECTRICAL DEVICE AND CABLE SEALING MEANS

James P. Smith, West Orange, N. J., assignor to Line Material Company, South Milwaukee, Wis., a corporation of Delaware Application October 31, 1935, Serial No. 47,550

4 Claims. (Cl. 247—6)

This invention relates to a combined housed electrical device and cable sealing means and is particularly directed to a combined disconnecting switch and cable sealing means.

Heretofore it has been the usual practice when connecting a conductor in a cable to an electrical instrumentality, such as a disconnecting switch for instance or fuse, to provide a pothead or potheads at the point where the cable terminates and thereafter lead the unsheathed conductor projecting therefrom to the device. Another method is merely to strip the sheathing back a ways and tape the projecting ends in an attempt to prevent grounding.

Objects of this invention are to provide a novel means to avoid the use of potheads or other cable terminating members and which at one and the same time provides an electrical device such, for example, as a housed disconnecting switch which may or may not be fused, and also a cable terminating device without requiring two separate and distinct means for accomplishing these results, thereby greatly reducing the expense and also decreasing the amount of room or space occupied by this arrangement.

In greater detail objects of this invention are to provide a fuse cut-out and a cable terminating means which obviates the necessity of separate fuse installation or a separate cable terminating means, and which, in more specific terms, employs a housed, for example porcelain, cut-out which is directly connected to the cable, thereby resulting in less hazard either to the operator or to the device through contact of animals or other foreign agents.

Further objects are to provide a device which may be mounted on pole arms, for instance, or in underground vaults or in other places, but which nevertheless insures the complete sealing of the cable to the porcelain or other housing of the cut-out, to thereby prevent either the entrance of moisture into the cable or any possible chance of shorting the cable terminal to the ground, and at the same time protecting any operator who has occasion to use the device. The construction is such that it eliminates the necessity of additional cross arms or rack installations and additional wiring, and thus materially reduces the space required, allowing a shorter pole to be used or a smaller space to be employed.

Further objects of this invention are to provide a cable sealing means and an easily operated cut-out to interrupt the service without any difficulty or exposure of the operator on the one hand, and to provide this combined structure which is so made that it may be provided with a fused cut-out if desired thereby eliminating the difficulty often encountered in pulling or closing a set of potheads with subsequent taping of the line taps back on the line, which frequently presents a distinct hazard to the lineman particularly on a pole line carrying more than one primary circuit. The combination device merely requires the opening of the cut-out which is a simple and safe operation.

Further objects are to provide a construction such that if it becomes necessary to renew the portion attaching the cable sheath to the cut-out housing, such portion may be readily removed and replaced and, on the other hand, if it is desired to replace the housing itself, as for example a cracked porcelain housing, such replacement may be easily effected without destroying the sheath terminating means.

An embodiment of the invention is shown in the accompanying drawing, in which:

Figure 1 is a vertical sectional elevation through the device.

Figure 2 is a rear view of the device, partly broken away, with a portion of the supporting bracket sectioned off.

Referring to the drawing, it will be seen that a cable 1 has been indicated as provided with a lead or other sheath 2 and that this cable leads to the cut-out which is provided with a porcelain or other type of housing 3 equipped with a rearwardly projecting boss 4 provided with a shouldered cavity.

The cut-out is provided with a lower terminal member 5 which is connected to the conductor 6 of the cable by means of a shouldered bolt 7. Preferably the conductor 6 is sweated into the shouldered or headed portion of the bolt 7. A gasket 8 is interposed between the head or shouldered portion of the bolt and the porcelain casing and preferably a gasket 9 is positioned between the inner portion of the housing 3 and the terminal member 5. Cement, such as neat porcelain cement or an alloy or other filling 10 may be run in between the terminal member 5 and the housing 3.

The outer end of the boss 4 carries a metal ferrule 11 which is secured in place in any suitable manner as by means of cement 12, such as neat porcelain cement or an alloy or other filling, and preferably a gasket 13 is provided between the inner end of this metal sleeve and the boss or cylindrical member 4.

The lead sheath 2 is passed through a brass or other fitting 14 in the form of a cylindrical member terminating in a conical portion 15 and provided with an outwardly projecting flange 16, see Figures 1 and 2. The sheath is preferably stopped off at 17 and it may be formed slightly bell-shaped as indicated. A wiped joint 18 is formed between the lead sheath and the fitting 14. The fitting 14 is securely bolted to the ferrule 11 by means of the bolts 19, preferably a gasket 20 being interposed between the inner flange 16 of the member 14 and the inturned flange of the ferrule 11.

After the parts are assembled as indicated, the plug 21 carried by the member 14 is removed and insulating compound is poured into the cavity within the member 14 and within the member 4. It is preferable to loosen the nut 22 holding the bolt 7 in place so as to allow air to escape during this filling operation. After the parts are fully filled with insulating compound and all of the air is out, the plug 21 is replaced and the nut 22 tightened, thus giving an air tight seal of high insulating quality around all of the parts within the members 14 and 4.

It is to be understood that other forms of wiping bells may be employed in place of the specific form of wiping bell 14.

The cut-out may be and preferably is a fuse type of cut-out. As indicated in the drawing, it is provided with a fuse tube 23 provided with an upper contact 24 and a lower contact 25 which engage the upper spring contacts 26 carried by the upper terminal member 27 and the lower spring contacts 28 carried by the lower terminal member 5. The upper terminal member 27 carries a conductor receiving portion 29, as indicated. Preferably the fuse tube 23 is supported from an insulating portion 30 which in turn passes through an aperture formed in the insulating door 31 and may be temporarily locked thereto by the latch 32, although any other type of construction could be followed.

The door is hinged adjacent its lower end as indicated at 33 and is provided with a swivelly mounted eyelet 34 which itself is provided with a latch 35 adapted to be positioned behind the catch 36. When it is desired to open the door, the handle 34 or eyelet member is rocked to unlatch the upper end of the door and thereafter the door is swung downwardly. The door may be detached at its lower hinged portion from the hook like hinge supports if desired, or the fuse tube may be removed from the door by rotating the latch 32 so that the fuse assembly may be lifted from the door.

Obviously the fuse link 37 may be renewed as it extends in the usual manner from the upper contact 24 of the fuse tube to the lower contact 25. Preferably an expulsion type fuse is employed and the lower portion of the fuse link extends out of the open bottom portion of the fuse tube and is clamped to the contact 25 by means of the thumb screw 38.

Any suitable mounting bracket may be provided, for example as indicated at 39, so that it may be clamped to a rack, cross arm of a pole, or in any other suitable manner.

It is apparent that if it becomes necessary to remove the cable, that it is not necessary to destroy or injure the cut-out. All that is necessary is to remove the drain plug 21 or else loosen the screws 19 and apply a torch to the member 14 to melt the insulating compound and allow it to run out. Thereafter the cable with the fitting 14 thereon, as well as the headed bolt 7, may be withdrawn and a new cable terminal portion may be substituted.

On the other hand, if the porcelain housing is cracked or the cut-out is otherwise damaged, it may also be replaced by following the procedure outlined hereinabove and a new cut-out structure may be substituted. The fitting 14 together with the cable and the wiped joint and the headed bolt 7 may be again used.

It will be seen that this composite device provides at one and the same time all of the benefits of a pothead with even more perfect insulating characteristics which excludes moisture, which increases the safety of the operator, and which prevents accidental short circuits from animals or other foreign agents contacting with the cable terminal portion. This portion is merely connected with a sheath and all of the internal portion of the cable is housed clear into the cut-out.

Very much less room is needed in the installation of a device of this type than where potheads and separate cut-outs are employed.

Additionally, there is quite a saving in the cost of this combined device as compared with that of a separate pothead and separate cut-out with all the incidental additional wiring and hardware.

Although this invention has been described in considerable detail, it is to be understood that such description is intended as illustrative rather than limiting, as the invention may be variously embodied and is to be interpreted as claimed.

I claim:

1. In an electrical device, a housing formed of insulating material and having an internally located terminal member, said housing having an external bushing provided with a cavity opening through the outer face of said bushing and extending inwardly towards said housing and terminated by an inner wall, said housing having an opening through the said inner wall at the inner end of the cavity in said bushing, a headed member located within the cavity of said bushing, conducting means extending from said headed member through said opening and including detachable screw means accessible interiorly of said housing for holding both said terminal member and headed member in place, a metal sheathed cable having a conductor secured to said headed member, and a wiping bell secured to the sheath of said cable and detachably secured to said bushing.

2. In an electrical device, a housing formed of insulating material and having an internally located terminal member, said housing having an external boss projecting therefrom and having a cavity extending inwardly from the outer end of said boss to adjacent said terminal, said housing having a wall at the inner end of said cavity provided with an opening, a conducting member located within said cavity, screw means electrically joining and detachably locking said terminal member and said conducting member in place, a metal sheathed cable having an inner conductor secured to said conducting member, and a cap member secured to the metal sheath of said cable and detachably secured to said boss.

3. In an electrical device, a housing formed of insulating material and having an internally located terminal member, said housing having an external boss projecting therefrom and having a cavity extending inwardly from the outer end of said boss to adjacent said terminal, said housing having a wall at the inner end of said cavity provided with an opening, a conducting member located within said cavity, screw means electrically joining and detachably locking said terminal member and said conducting member in place, a metal sheathed cable having an inner conductor secured to said conducting member, a metal ferrule secured to said boss, and a metal cap member secured to the metal sheath of said cable and detachably secured to said ferrule.

4. In an electrical device, a housing formed of insulating material and having an internally located terminal member, said housing having an external boss projecting therefrom and having a cavity extending inwardly from the outer end of said boss to adjacent said terminal, said housing having a wall at the inner end of said cavity provided with an opening, a conducting member located within said cavity, screw means electrically joining and detachably locking said terminal member and said conducting member in place, a metal sheathed cable having an inner conductor secured to said conducting member, a metal ferrule secured to said boss, and a metal cap member secured to the metal sheath of said cable and detachably secured to said ferrule, said screw means being accessible interiorly of said housing.

JAMES P. SMITH.